UNITED STATES PATENT OFFICE.

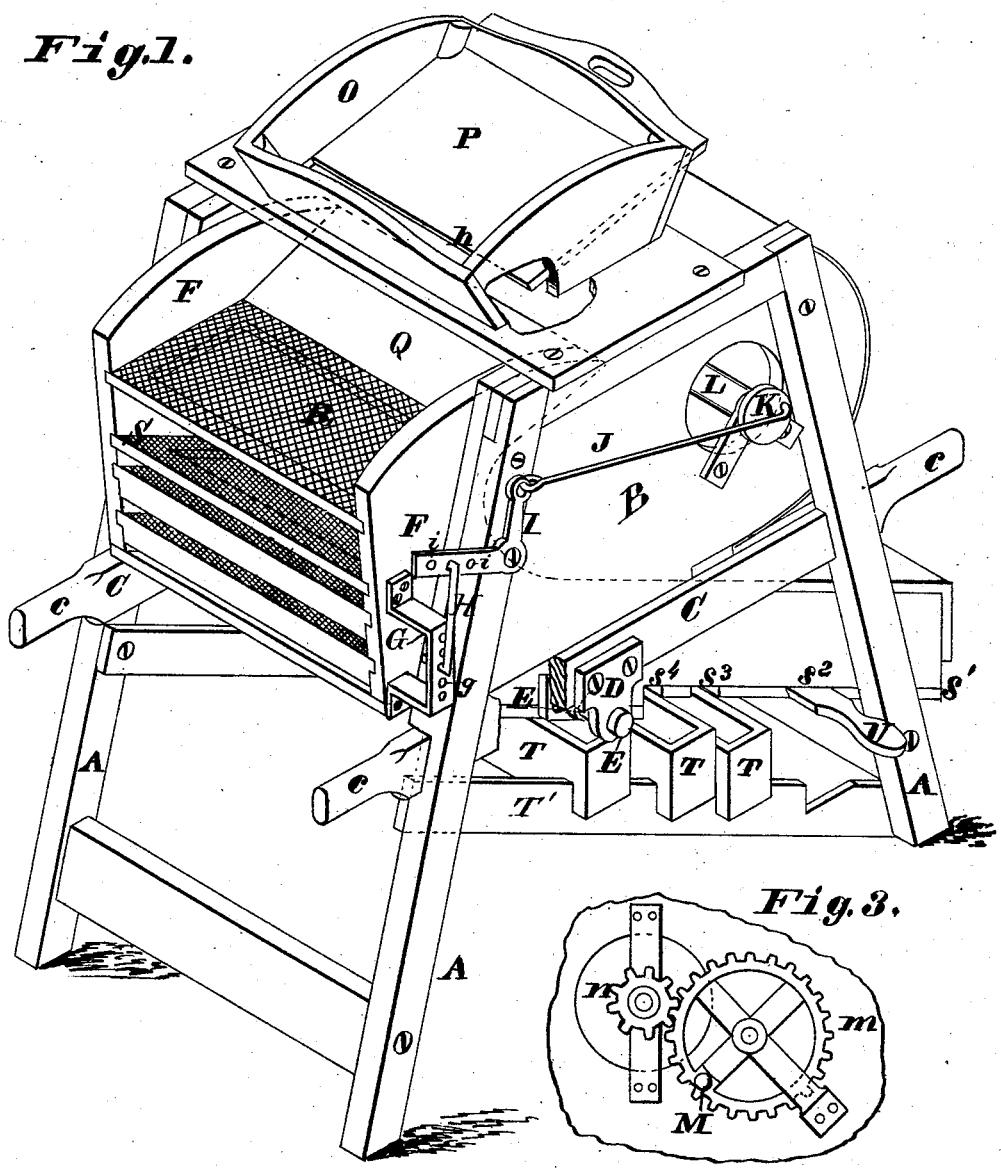

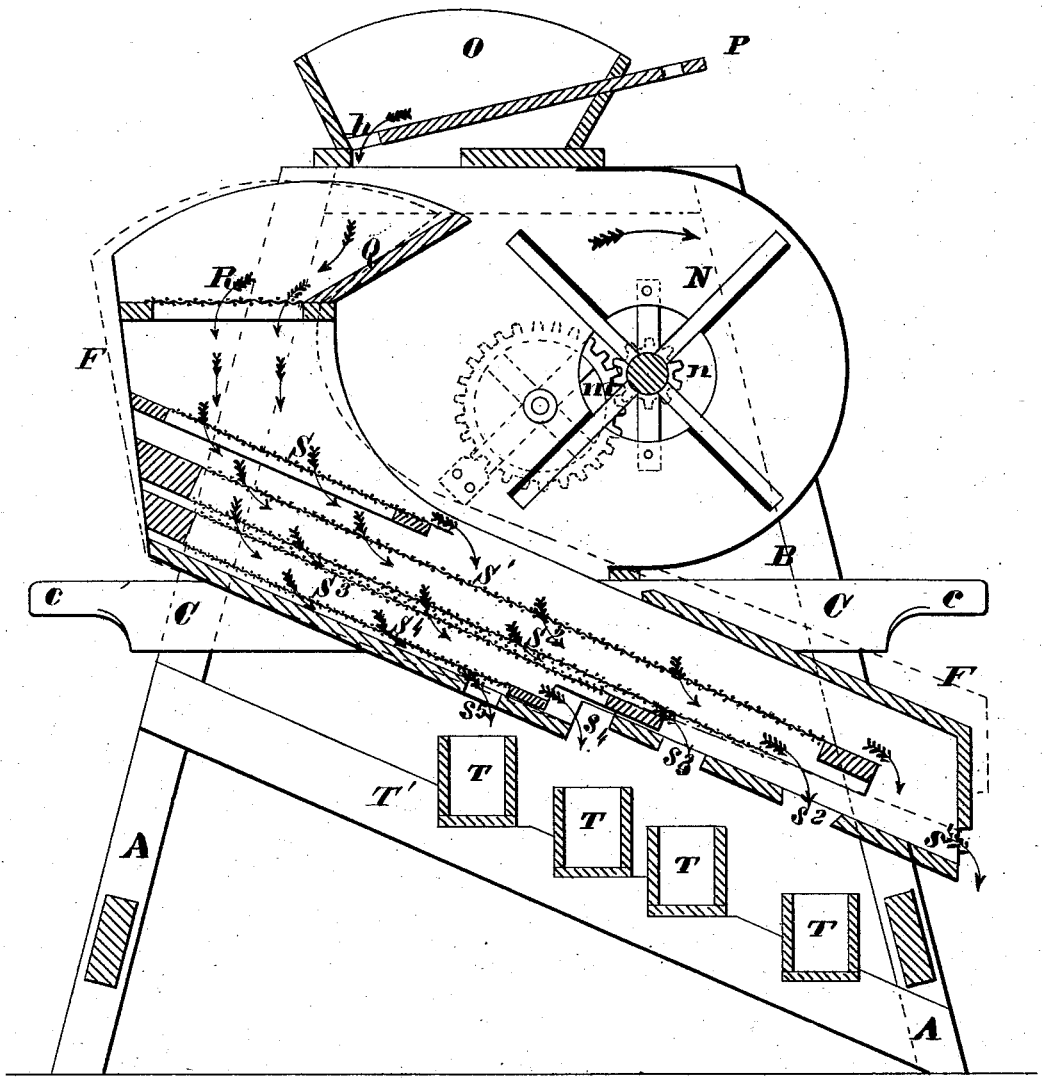

ISAAC BARNETT, OF VANDALIA, ILLINOIS.

GRAIN AND SEED SEPARATOR.

SPECIFICATION forming part of Letters Patent No. 244,526, dated July 19, 1881.

Application filed April 8, 1881. (No model.)

*To all whom it may concern:*

Be it known that I, ISAAC BARNETT, of Vandalia, in the county of Fayette and State of Illinois, have invented a certain new and useful Improvement in Grain and Seed Separators, of which the following is a full, clear, and exact description, reference being had to the accompanying drawings, forming part of this specification.

My improvement consists in suspending the shoe upon trunnions beneath its center of gravity, and in other minor features set forth in the specification.

Figure 1 is a perspective view of the machine. Fig. 2 is a longitudinal section of same. Fig. 3 is a detail side view of the driving-crank and gearing.

The legs are shown at A. These are suitably connected together by transverse and longitudinal bars and by the body or frame B.

C C are longitudinal or side bars, ending in handles c c. To the bars C are attached hangers D, which give bearings to the trunnions E, attached to the shoe F. I prefer to attach the trunnions to the under part of the shoe at points vertically below the mean center of gravity of the shoe, so that it shall be balanced thereon.

The shoe is oscillated by connection with the fan-shaft L by means of connecting-rods H and J, bell-crank I, and crank or crank-wheel K. The connecting-rod H is turned into a hook at each end, the upper end entering one of a series of holes, $i$, in the horizontal arm of the bell-crank, and the lower hooked end entering one of a series of holes, $g$, in the bracket G, which is attached to the shoe.

By changing the upper end of the connecting-rod H from one hole $i$ to another in the bell-crank the throw of the shoe is increased or diminished, and by changing the lower end of the connecting-rod H from one of the holes $g$ to another the inclination of the shoe upon its trunnions is changed so as to change the mean inclination of the sieves.

The fan-shaft can be turned by a hand-crank, M, or a belt-pulley, or other usual means.

N is the fan, turning in the direction of the arrow to blow the light refuse from the tail end of the machine.

O is the hopper, with a sliding gate or valve, P, to regulate the size of the orifice $p$, through which the grain passes down onto the inclined board Q of the shoe. The grain passes from the inclined board to the sieve R, by which the larger impurities are discharged and the grain and seeds drop down upon a sieve, S, which serves in some degree to sustain the grain under the direct influence of the fan.

Below the sieve S are a number of sieves, four being shown, and lettered $S'$ $S^2$ $S^3$ $S^4$, graduated as to size of meshes, the coarsest being at top and the finest at bottom.

The upper sieve, S, may be made to let everything of a smaller size than the plumpest grains fall through; or it may be made sufficiently coarse to allow all the perfect grains to fall through. The sieve $S'$ retains only the plumpest grains, and they are discharged at the head of the machine through orifice $s'$. The sieve $S^2$ retains the good second-class grain and allows everything smaller to drop on the sieve $S^3$, which, with the larger seeds, drops upon it. The sieve $S^4$ allows the passage through it of only the smaller seeds—such as grass-seed, &c. None of these seeds are retained in the shoe, but are all discharged through the inclined bottom board of the shoe or through orifice $s'$.

The material retained by each sieve is discharged through a separate orifice, as follows: from sieve $S'$ through orifice $s'$, $S^2$ through $s^2$, $S^3$ through $s^3$, $S^4$ through $s^4$, and the small seeds, passing through the finest sieve, $S^4$, are discharged through orifice $s^5$. The grain and seeds drop from these orifices into removable boxes T, supported on the inclined longitudinal bars $T'$. These bars are suitably notched to receive the boxes and retain them in position. The boxes should have cleats at bottom to prevent their endwise displacement.

U is a slide or gate, which is inserted in the aperture $s^2$ when it is desired to mix the two qualities of grain passing over the sieves or screens $S'$ and $S^2$. Then the said mixture is all discharged through the aperture $s'$.

I claim—

1. The combination, with oscillating shoe supported on bearings below its center of gravity, of the adjustable connection H and bell-crank I, having one or more holes, $i$, to regulate the amplitude of oscillation.

2. The combination of the bell-crank I, link H, and bracket G with adjusting-holes $g$, for the purpose set forth.

ISAAC BARNETT.

Witnesses:
SAML. KNIGHT,
GEO. H. KNIGHT.